UNITED STATES PATENT OFFICE.

ADOLF MARTINI, OF BERLIN, GERMANY.

GAS-IGNITING PILL.

SPECIFICATION forming part of Letters Patent No. 646,297, dated March 27, 1900.

Application filed December 29, 1899. Serial No. 742,012. (No specimens.)

*To all whom it may concern:*

Be it known that I, ADOLF MARTINI, a citizen of the Kingdom of Prussia, and a resident of Berlin, (whose post-office address is Leipzigerstrasse, No. 111,) in the Kingdom of Prussia, German Empire, have invented certain new and useful Improvements in Gas-Igniting Pills, of which the following is a specification.

Since the discovery of the catalytic properties of the metals of the platinum class numerous attempts have been made to manufacture effective and durable gas-ignition pills. Those substances most generally employed in the manufacture of this class of ignition-pills are platinum in a state of very fine distribution and meerschaum. In trying to make a most effective ignition-pill care has to be taken not only to distribute the platinum metals as thoroughly as possible in the pores of the pill-body and to separate the single particles by heterogeneous substances, but also to avoid a melting of the pill-body, which would form a hindrance to the entrance of the gases. Finally, these strong hygroscopic tendencies of the pill substance have to be taken into account. All this may be effected in a thorough and effective manner by adopting the method described hereinafter. The substances used are meerschaum, platinum metals, and the rare earths. The latter's use for these purposes is by no means a new one, as there have been recommended for use in this direction combinations of thorium and platinum with meerschaum, (English Patent No. 22,901 of 1898.)

The principal improvements forming the object of this invention consist in the manner of treating the meerschaum designed to form the body of the ignition-pill.

Up till now pieces of meerschaum are being impregnated with platinum chlorid and the latter reduced. Generally after this operation the soluble parts of the meerschaum are removed. This process is by no means perfect, and it has been found far more effective to proceed after the following manner: First of all, the soluble parts are to be removed from the meerschaum substance, for it is to these that the hygroscopicity of the latter is due. This process has to be effected without lessening the coherence of the remaining parts. To this effect pieces of meerschaum are treated with acids (especially hydrochloric acid) and water. Some species of meerschaum even permit the cautious use of alkalies, these latter, however, being apt to endanger the coherence of the substance if not applied properly. In this way a non-hygroscopic skeleton is produced which cannot properly be styled meerschaum any longer, but possesses all the qualities required for the body of a gas-ignition pill. This skeleton is impregnated with a solution of a salt of thorium or any other of the rare earths. The nitrates are especially adapted for this purpose. When the pores are thoroughly filled with the salt, the latter is reduced into the oxid by the application of heat. As the nitrous acid generated during this process might afterward affect the chemical properties of the ignition-pill, it is indispensable to lixiviate with hot water. The body of the pill thus prepared is now impregnated with a solution of platinum chlorid and the latter reduced into metal by heat or gases. In the latter case if water-gas is used to effect the reduction care has to be taken not to raise the temperature too much, as the rather large quantities of carbonic oxid contained therein might otherwise cause the formation of volatile double salts and a considerable loss of platinum. In general a reiterated cleansing with water and acids is necessary. In most cases the use of ammonia and steam will be most effective.

Having thus described the nature of my invention, what I claim as new is—

Process of manufacturing gas-ignition pills by aid of meerschaum, salts of the platinum class of metals and salts of the rare earths, the easily-soluble parts of meerschaum being removed and the remaining skeleton impregnated with a solution of salts of the rare earths, these latter being reduced into the oxids by aid of heat and the skeleton thoroughly lixiviated and impregnated with a solution of platinum salts, which are then reduced by aid of gases, this reduction being followed by a final treating with acids, steam and ammonia, substantially as set forth and described.

In testimony whereof I affix my signature in presence of two witnesses.

ADOLF MARTINI.

Witnesses:
WOLDEMAR HAUPT,
HENRY HASPER.